(12) United States Patent
Gaalaas et al.

(10) Patent No.: US 11,637,724 B2
(45) Date of Patent: Apr. 25, 2023

(54) CODING SCHEMES FOR COMMUNICATING MULTIPLE LOGIC STATES THROUGH A DIGITAL ISOLATOR

(71) Applicant: Analog Devices, Inc., Wilmington, MA (US)

(72) Inventors: Eric C. Gaalaas, Bedford, MA (US); Dongwan Ha, Arlington, MA (US); Jason J. Ziomek, South Burlington, VT (US); Bikiran Goswami, Burlington, MA (US); Brian Jadus, Williston, VT (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/334,445

(22) Filed: May 28, 2021

(65) Prior Publication Data
US 2022/0294672 A1 Sep. 15, 2022

Related U.S. Application Data

(60) Provisional application No. 63/160,711, filed on Mar. 12, 2021.

(51) Int. Cl.
*H04L 25/02* (2006.01)
*H02M 3/335* (2006.01)

(52) U.S. Cl.
CPC ..... *H04L 25/0292* (2013.01); *H02M 3/33523* (2013.01); *H04L 25/0266* (2013.01)

(58) Field of Classification Search
CPC ............ H04L 25/0292; H04L 25/0266; H02M 3/33523

USPC ......................................................... 375/340
See application file for complete search history.

(56) References Cited

U.S. PATENT DOCUMENTS

| | | | |
|---|---|---|---|
| 7,075,329 B2 | 7/2006 | Chen et al. | |
| 7,738,568 B2 | 6/2010 | Alfano et al. | |
| 7,923,710 B2 | 4/2011 | Crawley et al. | |
| 8,175,087 B2 | 5/2012 | Jadus | |

(Continued)

FOREIGN PATENT DOCUMENTS

| | | |
|---|---|---|
| EP | 0 962 081 A1 | 12/1999 |
| TW | I536776 B | 6/2016 |

(Continued)

OTHER PUBLICATIONS

International Search Report and Written Opinion dated Jun. 21, 2022 in connection with International Application No. PCT/US22/19750.

(Continued)

*Primary Examiner* — Leila Malek
(74) *Attorney, Agent, or Firm* — Wolf, Greenfield & Sacks, P.C.

(57) ABSTRACT

Methods and apparatus are disclosed for communicating multiple logic states across a digital isolator. The digital isolator is a universal serial bus (USB) isolator in some embodiments. The digital isolator includes one or more single-bit data channels. Three or more logic states of information are transmitted across the single-bit data channel(s). The logic states are distinguished by a pulse sequence, and in particular a number of edges of the pulse sequence and a final value or final edge of the pulse sequence.

20 Claims, 12 Drawing Sheets

(56) References Cited

U.S. PATENT DOCUMENTS

| | | | |
|---|---|---|---|
| 8,432,182 | B2 | 4/2013 | Gaalaas et al. |
| 8,477,856 | B2 | 7/2013 | Gaalaas |
| 8,525,547 | B2 | 9/2013 | Gaalaas et al. |
| 8,564,327 | B2 | 10/2013 | Gaalaas et al. |
| 8,829,955 | B1 | 9/2014 | Goswami |
| 9,584,147 | B2 | 2/2017 | Glibbery et al. |
| 9,998,076 | B2 | 6/2018 | Candage |
| RE47,083 | E | 10/2018 | Gaalaas et al. |
| RE47,097 | E | 10/2018 | Gaalaas et al. |
| RE47,098 | E | 10/2018 | Gaalaas et al. |
| 10,142,052 | B2 | 11/2018 | Milesi et al. |
| 10,942,217 | B2 | 3/2021 | Al-Shyoukh et al. |
| 2002/0010821 | A1 | 1/2002 | Yu et al. |
| 2003/0128053 | A1 | 7/2003 | Haigh et al. |
| 2006/0262600 | A1 | 11/2006 | Shirota et al. |
| 2016/0277048 | A1* | 9/2016 | Kramer .................... H03F 1/02 |
| 2019/0207742 | A1 | 7/2019 | Haroun et al. |
| 2021/0083907 | A1 | 3/2021 | Briano et al. |

FOREIGN PATENT DOCUMENTS

| | | |
|---|---|---|
| WO | WO 98/37672 A1 | 8/1998 |
| WO | WO 2008/064348 A2 | 5/2008 |

OTHER PUBLICATIONS

[No Author Listed], Full/Low Speed 2.5 kV USB Digital Isolator. Analog Devices Inc. Data Sheet, ADuM3160, Mar. 2014.; Rev. C, 16 pages.

[No Author Listed], iCoupler ADuM4160/ADuM3160 USB Isolator Evaluation Board. Analog Devices Inc. EVAL-ADuM4160EBZ User Guide, UG043, Jul. 2017; Rev. B, 8 pages.

[No Author Listed], Isolated USB Transceiver with Isolated Power. Analog Devices Inc. Data Sheet, LTM2884, Feb. 2020.; Rev. C, 24 pages.

Keeping, Use Integrated Digital Isolators to Protect Industrial Communications Networks. Digi-Key Electronics, Dec. 9, 2020. https://www.digikey.in/en/articles/use-integrated-digital-isolators-to-protect-industrial-communications-networks [last accessed Jun. 16, 2022]. 8 pages.

Singh, Signal and Encoding of USB System (Part 5/6). Engineer Garage. htttps://www.engineersgarage.com/signal-and-encoding-of-usb-system-part-5-6/ [last accessed Jun. 15, 2022). 6 pages.

\* cited by examiner

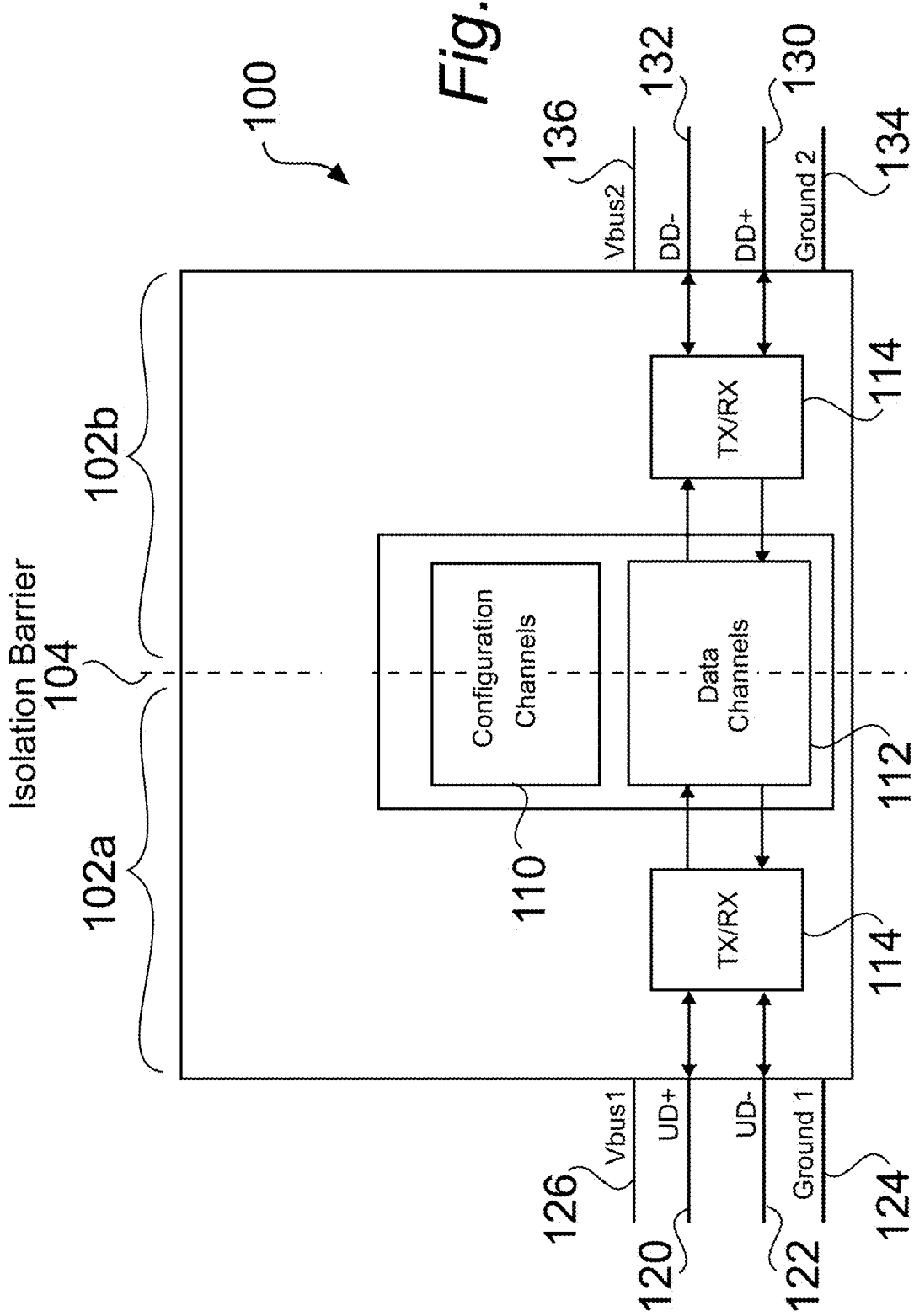

US 11,637,724 B2

CODING SCHEMES FOR COMMUNICATING MULTIPLE LOGIC STATES THROUGH A DIGITAL ISOLATOR

CROSS-REFERENCE TO RELATED APPLICATIONS

This application claims the benefit of U.S. Patent Application Ser. No. 63/160,711 filed Mar. 12, 2021 and entitled "CODING SCHEMES FOR COMMUNICATING MULTIPLE LOGIC STATES THROUGH A DIGITAL ISOLATOR," which is hereby incorporated by reference herein in its entirety.

FIELD OF THE DISCLOSURE

Aspects of the present application relate to a method and apparatus for communicating multiple logic states through a digital isolator.

BACKGROUND

A Universal Serial Bus (USB) digital isolator is a device that implements bi-directional USB communication across a DC isolation barrier separating two voltage domains. The separation is sometimes between a USB host and a USB peripheral, generally referred to as a USB device.

BRIEF SUMMARY

Methods and apparatus are disclosed for communicating multiple logic states across a digital isolator. The digital isolator is a universal serial bus (USB) isolator in some embodiments. The digital isolator includes one or more single-bit data channels. Three or more logic states of information are transmitted across the single-bit data channel(s). The logic states are distinguished by a pulse sequence, and in particular a number of edges of the pulse sequence and a final value or final edge of the pulse sequence.

According to an aspect of the present application, a method is provided for processing a digital pulse sequence transmitted across an isolation barrier of a digital isolator and representing a logic state of a data signal line. The method comprises: during a fixed period, counting a number of edges of the digital pulse sequence; determining a polarity of a representative edge of the digital pulse sequence or a final value of the digital pulse sequence during the fixed period; and determining the logic state from the number of edges and the polarity of the representative edge or the final value of the digital pulse sequence.

According to an aspect of the present application, a receiver is provided for processing a digital pulse sequence received across an isolation barrier of a digital isolator and representing a logic state of a data signal line. The receiver comprises an edge detector circuit configured to sample the received digital pulse sequence during a fixed time period, and further configured to produce an output signal responsive to one or more rising or falling edges detected in the received digital pulse sequence during the fixed time period. The receiver further comprises a counter circuit configured to count a total number of edges detected by the edge detector circuit during the fixed time period based on the output signal of the edge detector circuit. The receiver further comprises a decode logic circuit configured to: determine a polarity of a representative edge of the digital pulse sequence or a final value of the digital pulse sequence during the fixed period, based on the output of the edge detector circuit, and determine the logic state from the total number of edges counted by the counter circuit during the fixed time period, and the polarity of the representative edge or the final value of the digital pulse sequence.

According to an aspect of the present application, a coding method is provided for communicating at least three logic states across a digital isolator channel having an isolation barrier between different voltage domains. The method comprises: receiving at the digital isolator a data signal representing a logic state; encoding the logic state as a pulse sequence having a number of edges and a final value or representative edge uniquely identifying the logic state; and transmitting the pulse sequence across the isolation barrier.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 1 is a schematic view of a non-limiting example of a digital isolator having a clock channel, control channels, and data channels, according to a non-limiting embodiment of the present application.

DETAILED DESCRIPTION

Figure 2A:
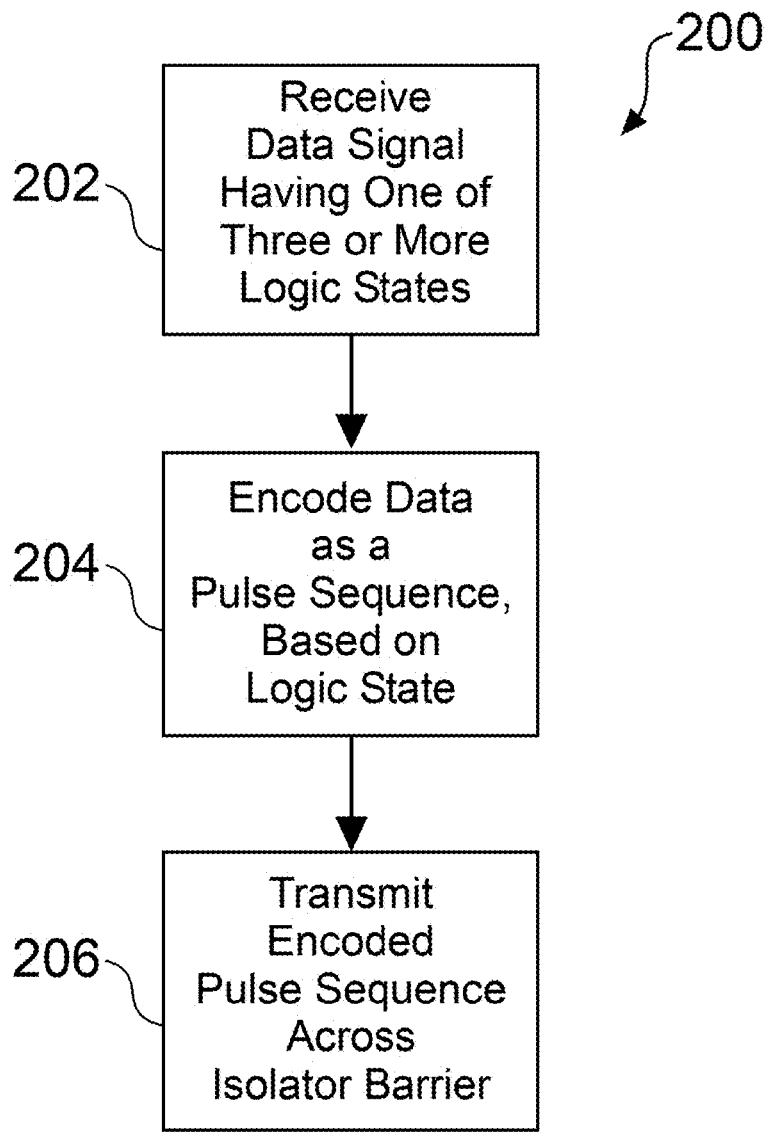
FIG. 2A is a flowchart of a method of encoding data for transmission across a data channel of a digital isolator, according to a non-limiting embodiment of the present application.

Aspects of the present application provide a data coding scheme which enables the transmission of more than two logic states across a single-bit data channel of a digital isolator. The data signal may assume three or more logic states. A given logic state is encoded into a pulse sequence in which the number of edges and the final value or a representative edge (e.g., a final edge) of the pulse sequence uniquely identify the logic state. The data signal encoded in this manner is communicated across the isolation barrier and received by a receiver on the secondary side of the isolator. The receiver includes decoding logic which counts the number of edges during a given period and determines the final value or representative edge (e.g., final edge) of the received pulse sequence, thus determining the logic state. In this manner, digital isolator circuitry configured to transmit a single bit serial data stream can be used to transmit two bits or more of input information using the coding scheme, avoiding complex and costly circuitry and reducing the number of data channels needed to convey desired information. Such operation may provide isolated USB2.0 communication, among other potential types.

According to an aspect of the present application, a digital isolator configured to operate according to the data coding scheme described above is provided. The digital isolator may be configured to implement data transmission according to an encoding and decoding scheme which allows for three or more logic states to be communicated across a data channel which transmits two logic levels. In some embodiments, the communication of three logic states is achieved through the use of a pulse encoding scheme, in conjunction with digital isolator transmit and receive circuits that are configured to work with two voltage levels. In some embodiments, the three logic states are represented by different pulse sequences. The pulse sequences may differ in terms of some combination of the number of edges and the final value or representative edge type, allowing for differentiation of the logic states. In some embodiments, the representative edge type is the final edge type.

FIG. 1 is a schematic view of a digital isolator 100 permitting communication of three or more logic states across a data channel supporting two logic levels, according to a non-limiting embodiment of the present application. In some embodiments, the digital isolator 100 may be a USB isolator, although alternatives are possible. The digital isolator 100 comprises voltage domains 102a and 102b galvanically isolated by an isolation barrier 104. The digital isolator 100 further comprises configuration channels 110 and data channels 112 bridging the isolation barrier 104. Transmit and receive circuitry (TX/RX) 114 is included and operates as part of the data channel communication path. The digital isolator includes several terminals or pins for communication with external devices, including terminals UD+ 120, UD− 122, Ground 1 124, Vbus 1 126, DD+ 130, DD− 132, Ground 2 134, and Vbus2 136.

The voltage domains 102a and 102b may be any suitable voltage domains. In some embodiments, the voltage domains may differ in the maximum voltage they handle. For example, one of the voltage domains may be a 5V domain, and the other a 1.8V domain, although these are non-limiting examples. For instance, the voltage domains may differ in their maximum voltage handling capability by tens or even hundreds of Volts. In some embodiments, the voltage domains 102a and 102b may be referenced to different ground potentials. For example, Ground 1 and Ground 2 may differ. In some embodiments, both conditions—maximum voltage handling capability and ground reference—differ between the voltage domains 102a and 102b. The circuitry in one voltage domain may be implemented on a first semiconductor die or chip, and the circuitry in the other voltage domain may be implemented on a separate semiconductor die or chip.

The isolation barrier 104 may be realized in any suitable manner. In some embodiments, the isolation barrier 104 is realized by a dielectric material. For example, the circuitry of voltage domain 102b may be implemented on a semiconductor die, with a dielectric layer provided on top to isolate the circuitry from the circuitry of voltage domain 102a.

The configuration channels 110 communicate configuration and/or clock information across the isolation barrier 104. For example, if the digital isolator 100 is a USB isolator, the configuration channels 110 may communicate non-data USB configuration and operating states, such as the device speed mode, suspend, or other states. If clock information is to be transmitted across the isolation barrier 104, that may be done by one or more of the configuration channels 110. Alternatively, circuitry may be provided within each voltage domain 102a and 102b to handle clocking of the other circuitry in that voltage domain.

Any suitable number of configuration channels may be provided. In some embodiments, a single configuration channel may be provided. In other embodiments, multiple configuration channels may be provided.

The configuration channels 110 comprise any suitable circuitry for communicating the type of information described above. For example, each of the configuration channels 110 is an isolated channel in this non-limiting embodiment, providing isolated communication across the isolation barrier 104. Transformers, capacitors, or optical isolators may be included within the configuration channel(s) as isolation components allowing communication across the isolation barrier 104.

The data channels 112 are configured to communicate data across the isolation barrier 104. They include suitable circuitry for doing so. Each of the data channels 112 is an isolated channel in this example, providing isolated communication across the isolation barrier 104. Transformers, capacitors, or optical isolators may be included within the data channels as isolation components allowing communication across the isolation barrier 104.

The data channels 112 may include two or more data channels, which in combination may provide bidirectional communication. In some embodiments, each of the data channels 112 is unidirectional. For example, one data channel may communicate information from UD+ and UD− to DD− and DD+, and another data channel may communicate information in the opposite direction. Non-limiting examples of the circuitry of data channels 112 are described further below in connection with FIGS. 5-7.

The data channels 112 may be configured to transmit a serial stream of two logic levels. For example, the data channels 112 may comprise circuitry configured to transmit logical 1's and 0's. In this manner, the data channels 112 may be single bit data channels. However, as described above and described further below, the data channels may convey more than one bit of information serially using the encoding scheme disclosed herein.

The transmit and receive circuitry 114 is located on both sides of the isolation barrier 104 and operates as part of the data communication. The terminals UD+ 120, UD- 122, Ground 1 124, and Vbus1 126 may be connected to a first external device (not shown), and the terminals DD+ 130, DD- 132, Ground 2 134, and Vbus2 136 may be connected to a second external device (not shown). For example, the first external device may be a USB host and the second external device may be a USB peripheral. Data is communicated between the external devices via the data channels 112. The data may travel in either direction. For example, the data may enter the digital isolator 100 on terminals UD+ 120 and UD- 122 and be conveyed out terminals DD+ 130 and DD- 132, or vice versa. The data may travel through the transmit and receive circuitry 114 and may be encoded and decoded in the manner described previously herein and described further below. Non-limiting examples of the transmit and receive circuitry 114 are also described further below.

The digital isolator may be configured to communicate three or more logic states across the data channels 112. The digital isolator 100 may couple to devices which communicate data over two wires, such as with a USB2.0 communication protocol. The data may be received on terminals UD+ 120 and UD- 122 or DD+ 130 and DD- 132. For example, an input data signal can be received at the UD+ 120 and UD- 122 terminals. The signal on each of those terminals may assume a logic 1 or logic 0 level. The combination of those two signals provides four possible logic states: "Differential +1" in which value of UD+ is a logic 1 (high) and the value on UD- is a logic 0 (low), "Differential -1" in which the value on UD+ is a logic 0 (low) and the value on UD- is a logic 1 (high), "Single-ended 0 (SE0)" in which UD+ and UD- carry a logic 0 (low), and "Single-ended 1 (SE1)" in which UD+ and UD- carry a logic 1 (high). In some embodiments, only three of the logic states are used. For example, the SE1 state may not be used in some embodiments. Since the data channels 112 may be configured to transmit a serial one-bit data stream using only two logic levels, a single data channel would be unable to transmit all three of the input logic states as is. Thus, according to an aspect of the present application, the received logic state may be encoded into a pulse sequence for transmission across the isolation barrier 104. The pulse sequence may be made up of pulses of only two voltage levels, making them amenable to transmission across a single data channel, but may be characterized by a number of pulses and final value or final edge which allow for differentiation of three or more logic states. When received on the other side of the isolation barrier, the pulse sequence may be decoded to recreate the input logic state, which may then be output from the digital isolator 100. Non-limiting examples of suitable encoding and decoding as may be performed by the digital isolator 100 are described below in connection with FIGS. 2A and 2B.

Although the preceding example describes a situation in which more than two logic states may be defined by values on two or more wires, it should be appreciated that the various aspects described herein relating to encoding three or more logic states for transmission across an isolated data channel are not limited in this respect. In some embodiments, three or more logic states may be defined on a single wire, or by values on more than two wires. Encoding techniques according to the present application may be implemented with such scenarios as well.

Figure 2B:
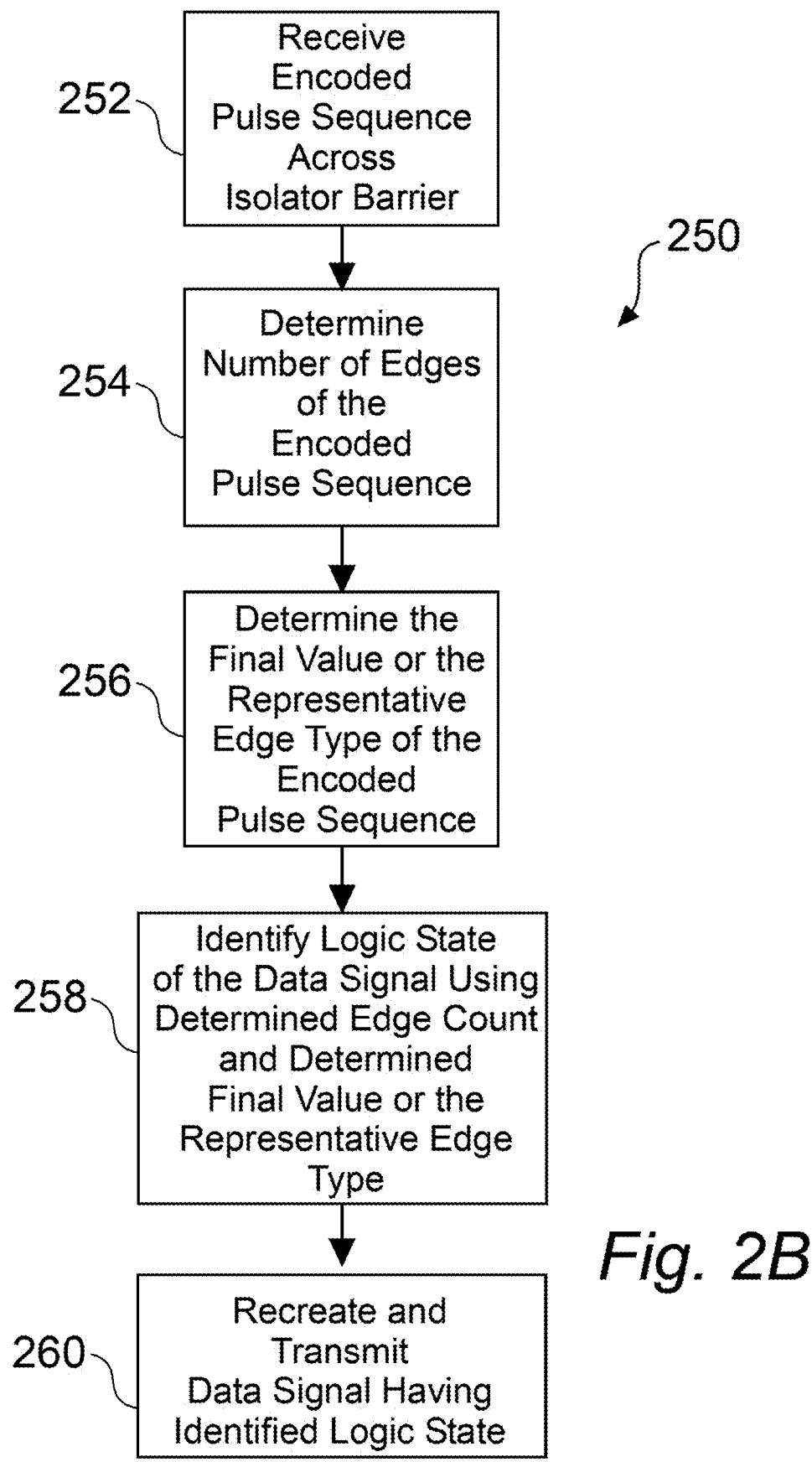
FIG. 2B is a flowchart of a method of decoding data received across a data channel of a digital isolator and encoded in the manner shown in FIG. 2A, according to a non-limiting embodiment of the present application.

FIGS. 2A and 2B are flow charts illustrating a method of encoding and decoding, respectively, data transmitted across a data channel of a digital isolator, according to a non-limiting embodiment of the present application. For example, the methods of FIGS. 2A and 2B may be implemented by the digital isolator 100 of FIG. 1. The encoding and decoding methods illustrated allow for the transmission of three or more logic states across a single-bit data channel. These methods may be used to transmit USB data across a data channel of a USB isolator.

The method 200 illustrated in FIG. 2A is a method of encoding data for transmission across a data channel of a digital isolator, such as digital isolator 100. The data may assume three or more logic states. For example, the data may assume the "Differential +1," "Differential -1," and "Single-ended 0 (SE0)," logic states described above in connection with FIG. 1. These three logic states may be used by the USB2.0 protocol, as a non-limiting example.

In stage 202 of the method 200, the data to be transmitted across the data channel is received at a first side of the digital isolator from an external device. For example, referring again to FIG. 1, the UD+ 120 and UD- 122 terminals may receive the data from a USB host device. For purposes of explanation, the side of the isolator receiving the data from the external device may be considered the "primary" side. This designation is non-limiting however, since data communication may be bidirectional. The received data may assume any of three or more logic states, such as Differential +1, Differential -1, or Single-ended 0.

In stage 204 of the method 200, the received logic state data is encoded as a pulse sequence. The pulse sequence may be generated using any suitable pulse generator, a non-limiting example of which is described further below in connection with FIG. 7. The pulse sequence includes pulses assuming two logic levels, 1 and 0 (or high and low). The number of pulses, and the final value of the pulse sequence or a representative edge (e.g., the final edge) of the pulse sequence, may be selected to uniquely identify the logic state of the received data. Non-limiting examples of pulse sequences and their manner of distinguishing between input logic states will be described further below in connection with FIGS. 3A and 3B.

In stage 206, the coded pulse sequence is transmitted across the isolation barrier to the secondary (receiving) side of the digital isolator. For instance, considering the non-limiting example of digital isolator 100 of FIG. 1, the coded pulse sequence may be transmitted from voltage domain 102a to voltage domain 102b across the isolation barrier 104 via an isolation component (e.g., a transformer) of the data channel.

The method 250 illustrated in FIG. 2B is a method of decoding data transmitted across a data channel of a digital isolator, and which was encoded using the method 200 of FIG. 2A. The method 250 may be implemented by the digital isolator 100 of FIG. 1, as a non-limiting example. In stage 252, the receiver on the receiving side of the digital isolator receives the encoded pulse sequence encoded by the method 200 of FIG. 2A. As described above, the encoded pulse sequence is characterized by a number of edges and a final value or representative edge (e.g., a final edge).

At stage 254, the number of edges of the encoded pulse sequence is determined. The receiver may include circuitry for determining the number of edges. For example, the receiver may include an edge counter. The number of edges may be counted during a set period. For example, a fixed period set by a one-shot or other circuit may be initiated when the pulse sequence is received, and the number of edges during the fixed period may be counted. The fixed period may be selected to be longer than any expected pulse sequence, ensuring that a complete pulse sequence is counted before resetting the counting period.

At stage 256, the final value or representative (e.g., final) edge of the received pulse sequence is determined. For example, the final value may be determined to be a high or low value (e.g., 1 or 0). Alternatively, the final edge may be determined to be a rising edge or falling edge, also referred to herein as the polarity of the edge (rising or falling). A final edge that is a rising edge corresponds to a final value that is a high value. A final edge that is a falling edge corresponds to a final value that is a low value. Thus, determination of the final edge is effectively the same as determining the final value of the pulse sequence, and vice versa. However, in some embodiments an edge other than the final edge may be used, so long as representative of the final value of the pulse sequence. For example, the second to last edge could be used, since it is known that the second to last edge would have an opposite polarity to the final edge. Any other suitable edge could be used.

At stage 258, the determined edge count and the final value or representative (e.g., final) edge of the received pulse sequence are processed to identify the logic state of the data signal. This processing may be performed in any suitable manner. For example, a logic routine may be executed by a processor, or the processing may be hardwired by a plurality of logic gates. The number of edges may be used to narrow by at least one the possible logic states represented by the encoded pulse sequence. The final value of the pulse sequence or representative (e.g., final) edge of the pulse sequence may also be used to narrow by at least one the possible logic states represented by the encoded pulse sequence. Thus, the combination of number of edges and the final value or representative (e.g., final) edge in combination may serve to uniquely identify a logic state from among three potential logic states that could be represented by the encoded pulse sequence.

At stage 260, the determined logic state may be recreated on a pair of wires and transmitted out of the isolator. For example, the logic state may be recreated on terminals DD+ 130 and DD− 132 and sent to an external device, such as a USB peripheral.

It should be appreciated that the combination of methods 200 and 250 may provide isolated data communication between two devices coupled by a digital isolator, such as digital isolator 100 of FIG. 1. Moreover, the data communication may entail communicating three or more logic states over a data communication channel utilizing only two logic levels.

Figure 3A:
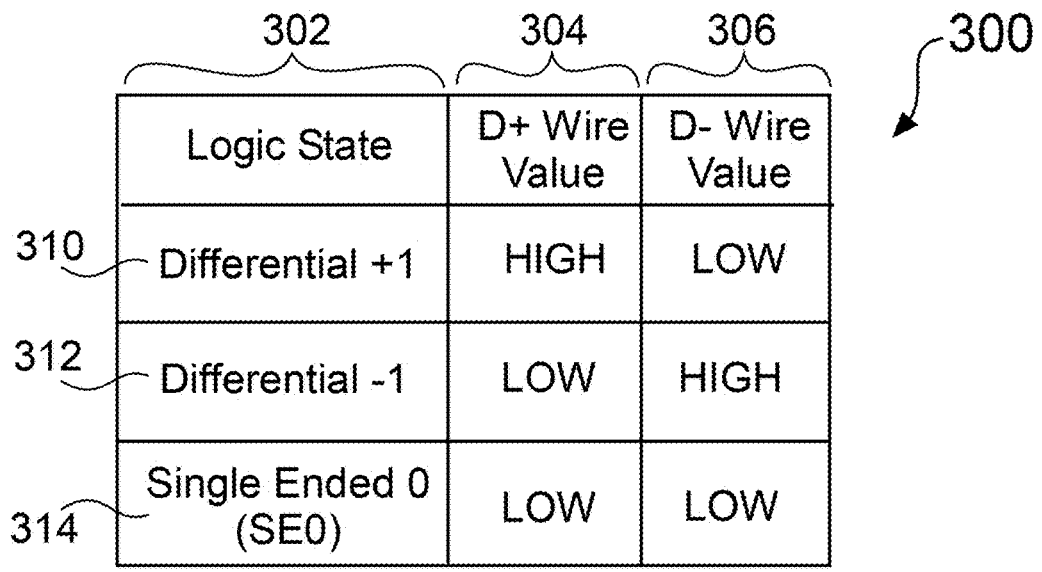
FIG. 3A is a chart of three logic states for a digital isolator, according to a non-limiting embodiment of the present application.

FIG. 3A is a chart 300 showing three logic states 302 for a non-limiting example of a digital isolator having D+ and D− inputs 120 and 122. The illustrated logic states may correspond to those described previously in connection with FIG. 1. For example, a Differential +1 state 310 can be defined by a D+ wire value 304 of 1 (HIGH) and a D− wire value 306 of 0 (LOW). In this example, a Differential −1 state 312 is defined by a D+ wire value 304 of 0 (LOW) and a D− wire value 306 of 1 (HIGH). A single ended zero (SE0) state 314 is defined by a D+ wire value 304 of 0 (LOW) and a D− wire value 306 of 0 (LOW).

Figure 3B:
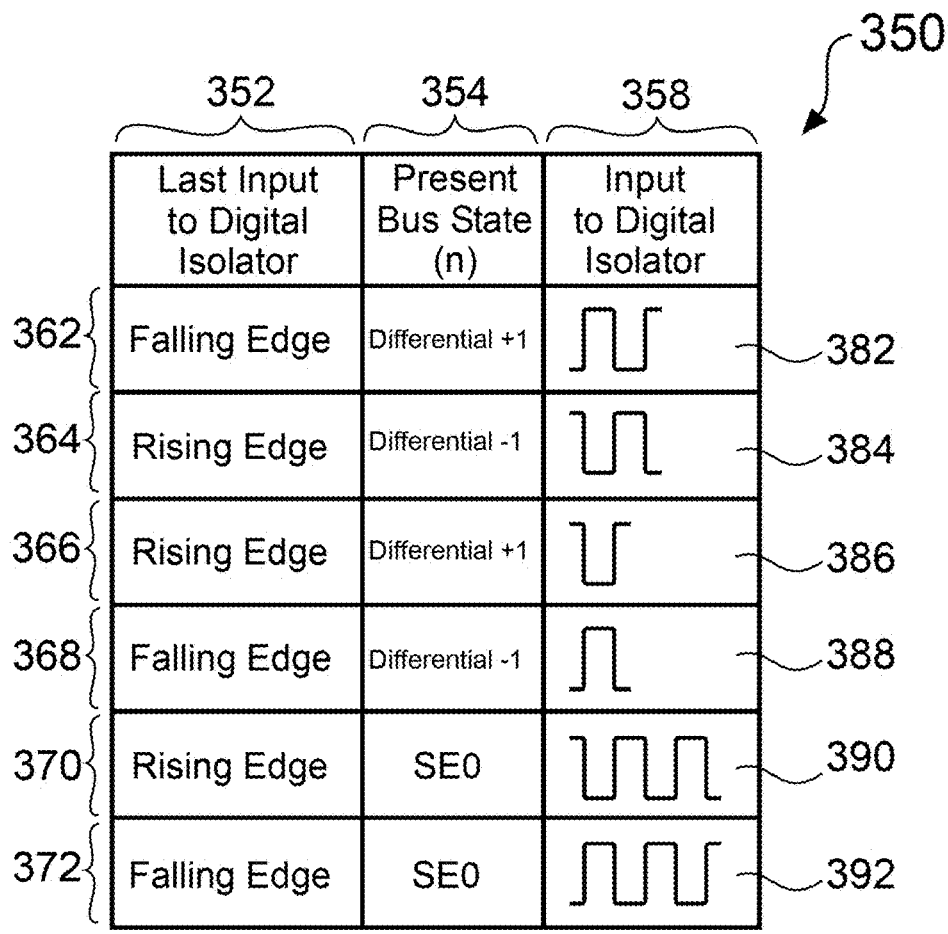
FIG. 3B shows non-limiting coded pulse sequences for coding certain logical states of a digital isolator, according to a non-limiting embodiment of the present application.

FIG. 3B illustrates an example of how different logic states of a data signal may be associated with different values of two characteristics of a pulse sequence, namely different numbers of edges and different final values or final edges of a pulse sequence. Thus, FIG. 3B illustrates an example of a coding scheme 350 that may be used in the methods 200 and 250 of FIGS. 2A and 2B, respectively, and that may be implemented by a digital isolator according to aspects of the present application, such as digital isolator 100 of FIG. 1.

The coding scheme 350 illustrates examples of pulse sequences 358 that may be associated with the three logic states Differential +1, Differential −1, and SE0, described previously. There are two alternative pulse sequences shown for each of the three possible logic states. Two alternatives are provided for each logic state since the exact pulse sequence may depend on the preceding logic state and the final value of the pulse sequence associated with that preceding logic state. Since the pulse sequence of the preceding logic state may have a final value of 1 or 0, the pulse sequence associated with a given logic state may differ depending on whether it is starting from a high or low value. Further explanation is provided with specific reference to FIG. 3B.

As described previously, logic states may be associated with different numbers of edges of an encoded pulse sequence. In the example of FIG. 3B, a threshold number of edges of four is used. The logic states Differential +1 and Differential −1 are associated with pulse sequences having fewer than four edges (e.g., three edges), and the logic state SE0 is associated with pulse sequences having more than four edges (e.g., five edges). The use of four edges as a threshold number is a non-limiting example.

FIG. 3B illustrates two alternative pulse sequences for the Differential +1 state, in rows 362 and 366. Specifically, pulse sequences 382 and 386 both represent the Differential +1 state. Pulse sequences 382 and 386 both have fewer than four edges. Also, both of pulse sequences 382 and 386 have a final value that is high (e.g., 1), and therefore a final edge that is a rising edge. That is, there are two pulse sequences 382 and 386 that each have a number of edges fewer than four and a final value that is high. The difference between pulse sequences 382 and 386 is that pulse sequence 382 starts with a low value, whereas pulse sequence 386 starts with a high value. Whether pulse sequence 382 or 386 is used depends on the previous logic state on the bus, as shown at column 352 as the last input to the digital isolator.

FIG. 3B illustrates two alternative pulse sequences for the Differential −1 state, in rows 364 and 368. Specifically, pulse sequences 384 and 388 both represent the Differential −1 state. Pulse sequences 384 and 388 both have fewer than four edges. Also, both of pulse sequences 384 and 388 have a final value that is low (e.g., 0), and therefore a final edge that is a falling edge. That is, there are two pulse sequences 384 and 388 that each have a number of edges fewer than four and a final value that is low. The difference between pulse sequences 284 and 388 is that pulse sequence 284 starts with a high value, whereas pulse sequence 388 starts with a low value. Whether pulse sequence 384 or 388 is used depends on the previous logic state on the bus, as shown at column 352.

The logic states Differential +1 and Differential −1 can be distinguished from each other using the pulse sequences 382, 384, 386, and 388. All four pulse sequences have fewer than four edges, which according to the non-limiting coding scheme 350 indicates that they represent either the Differential +1 logic state or the Differential −1 logic state. However, as described above, the pulse sequences 382 and 386 have a final value that is high (and therefore a final edge that is a rising edge) while pulse sequences 384 and 388 have a final value that is low (and therefore a final edge that is a falling edge). Thus, when a pulse sequence has fewer than four edges, it is known that the pulse sequence represents either the Differential +1 or Differential −1 logic state. The final value of the pulse sequence differentiates between those two.

FIG. 3B illustrates two alternative pulse sequences for the SE0 state, in rows 370 and 372. Specifically, pulse sequences 390 and 392 both represent the SE0 state. Pulse sequences 390 and 392 both have more than four edges. Pulse sequences 390 and 392 have differing final values—pulse sequence 390 ends high while pulse sequence 392 ends low—depending on the previous logic state, as shown at column 352.

FIG. 3B therefore illustrates how the pulse sequence characteristics of edge number and final value or final edge can be used to distinguish between three logic states. A pulse sequence having more than four edges (e.g., pulse sequence 390 or 392) uniquely identifies the SE0 logic states. A pulse sequence having fewer than four edges and a final value that is high (e.g., pulse sequences 382 and 386) uniquely identifies the Differential +1 logic state. A pulse sequence having fewer than four edges and a final value that is low (e.g., pulse sequences 384 and 388) uniquely identifies the Differential −1 logic state.

The coding scheme 350 differentiates between short pulse sequences and long pulse sequences. Short pulse sequences are those having a number of edges fewer than a threshold. Long pulse sequences are those having a number of edges greater than the threshold. The association of logic states with such pulse sequence lengths may be made to provide power efficient operation. Longer pulse sequences will typically require more power to generate, while shorter pulse sequences will require less power. Thus, associating less frequently occurring logic states with longer pulse sequences may conserve power compared to associating more commonly occurring logic states with longer pulse sequences. In some embodiments, the SE0 logic state is likely to occur less frequently than the Differential +1 and Differential −1 logic states. For instance, in the context of USB2.0 communications, the SE0 state may be reserved for specific USB 2.0 functions, such as for Disconnect, Reset, and End of Packet (EOP) operations, which may arise less frequently than the Differential +1 and Differential −1 logic states. Therefore, associating SE0 with the longer pulse sequence, as is done in coding scheme 350, may provide power efficient operation.

The coding scheme 350 may be used to communicate three logic states as USB 2.0 bus states for full speed (FS) data (12 Mbps) or low speed (LS) data (1.5 Mbps).

While the non-limiting example of a coding scheme 350 shown in FIG. 3B may be used to distinguish between three logic states, it should be understood that the present application is not limited to distinguishing between only three logic states. Aspects of the present application may be used to distinguish between four or more logic states using encoding techniques as described herein. Aspect of the present may be used to communicate four logic states of a 2-bit signal, or $2^N$ logic states of an N-bit signal. According to an aspect of the present application, the number of pulses is used to indicate the bit number within a multi-bit word, and the polarity of one of the edges in the pulse sequence to indicate the bit value. In some embodiments, the polarity of the final edge is used to indicate bit value.

The method 200 of FIG. 2A may utilize the coding scheme 350 of FIG. 3B at stage 204. The method 250 likewise may utilize the coding scheme 350 at stage 358 to identify the logic state represented by the pulse sequence.

Figure 4A:
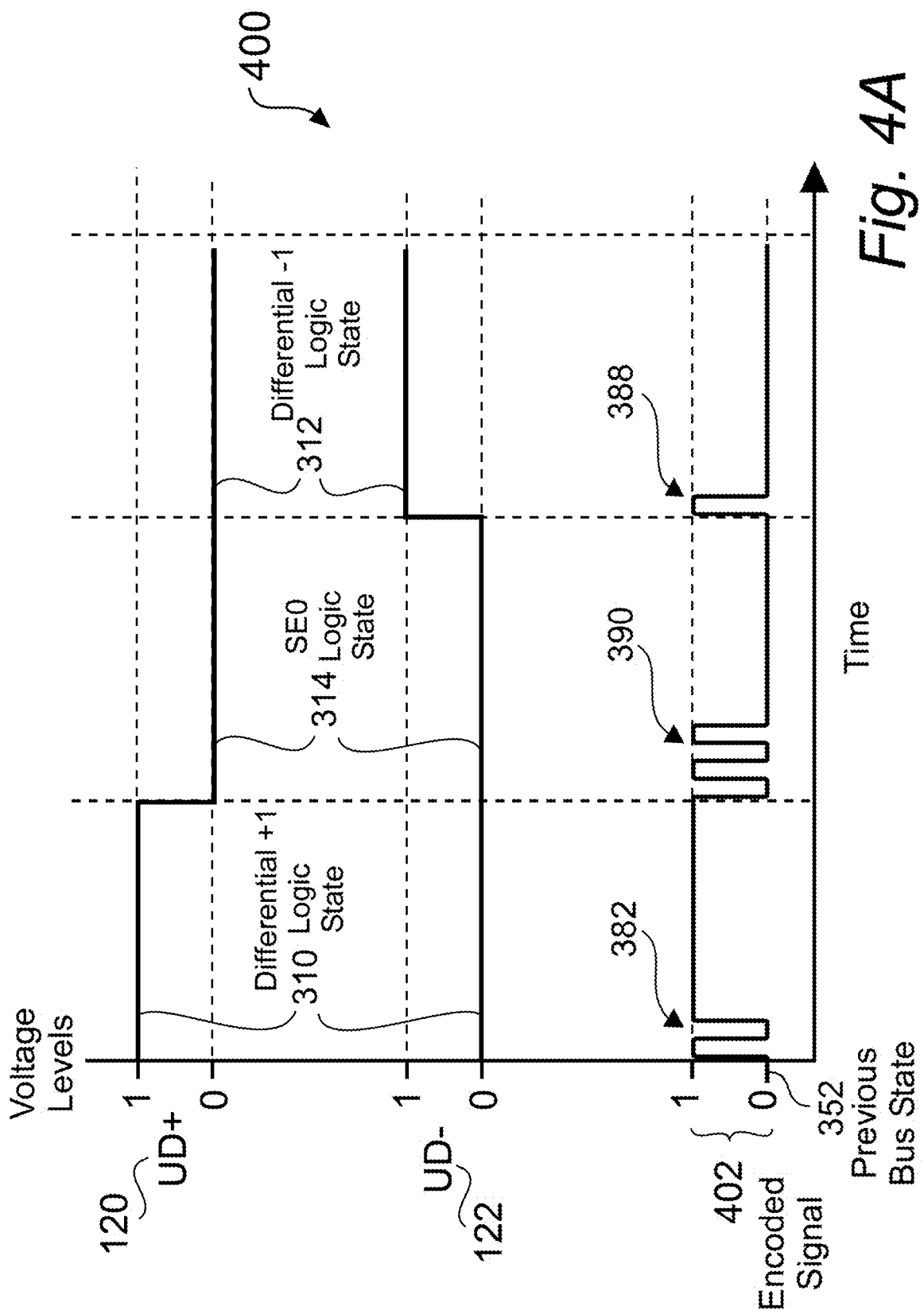
FIG. 4A is a timing diagram illustrating non-limiting examples of pulse sequences used to code logic states of a digital isolator, such as may be done in implementing the method of FIG. 2A.

FIG. 4A is a timing diagram 400 of a non-limiting example implementation of the coding that may be used in the method 200 of FIG. 2A. The illustrated coding is also consistent with the coding scheme 350 of FIG. 3B. The horizontal axis represents time. The vertical axis shows voltage levels of three different signals, namely the signal received at terminal UD+ 120 (which may be 1 or 0), the signal received at terminal UD− 122 (which may be 1 or 0), and the encoded signal 402 (which assumes values of 1 and 0). The timing diagram 400 illustrates three input logic states, and the corresponding encoded signal.

The first input logic state is the Differential +1 state 310 (from FIG. 3A). In this state, the value at terminal UD+ 120 is a logic high (1), and the value at terminal UD-122 is a logic low (0). The pulse sequence 382 from FIG. 3B may be generated to encode the logic state. In this non-limiting example, it is assumed the previous bus state 352 is such that the previous pulse sequence had a final value of zero, as shown.

The second input logic state is the SE0 state 314 (from FIG. 3A). In this state, the values at terminals UD+ 120 and UD− 122 are a logic low (0). The pulse sequence 390 from FIG. 3B may be generated to encode this logic state.

The third input logic state is the Differential −1 state 312 (from FIG. 3A). In this state, the value at terminal UD+ 120 is a logic low (0) and the value terminal UD− 122 is a logic high (1). The pulse sequence 388 from FIG. 3B may be generated to encode this logic state.

Figure 4B:
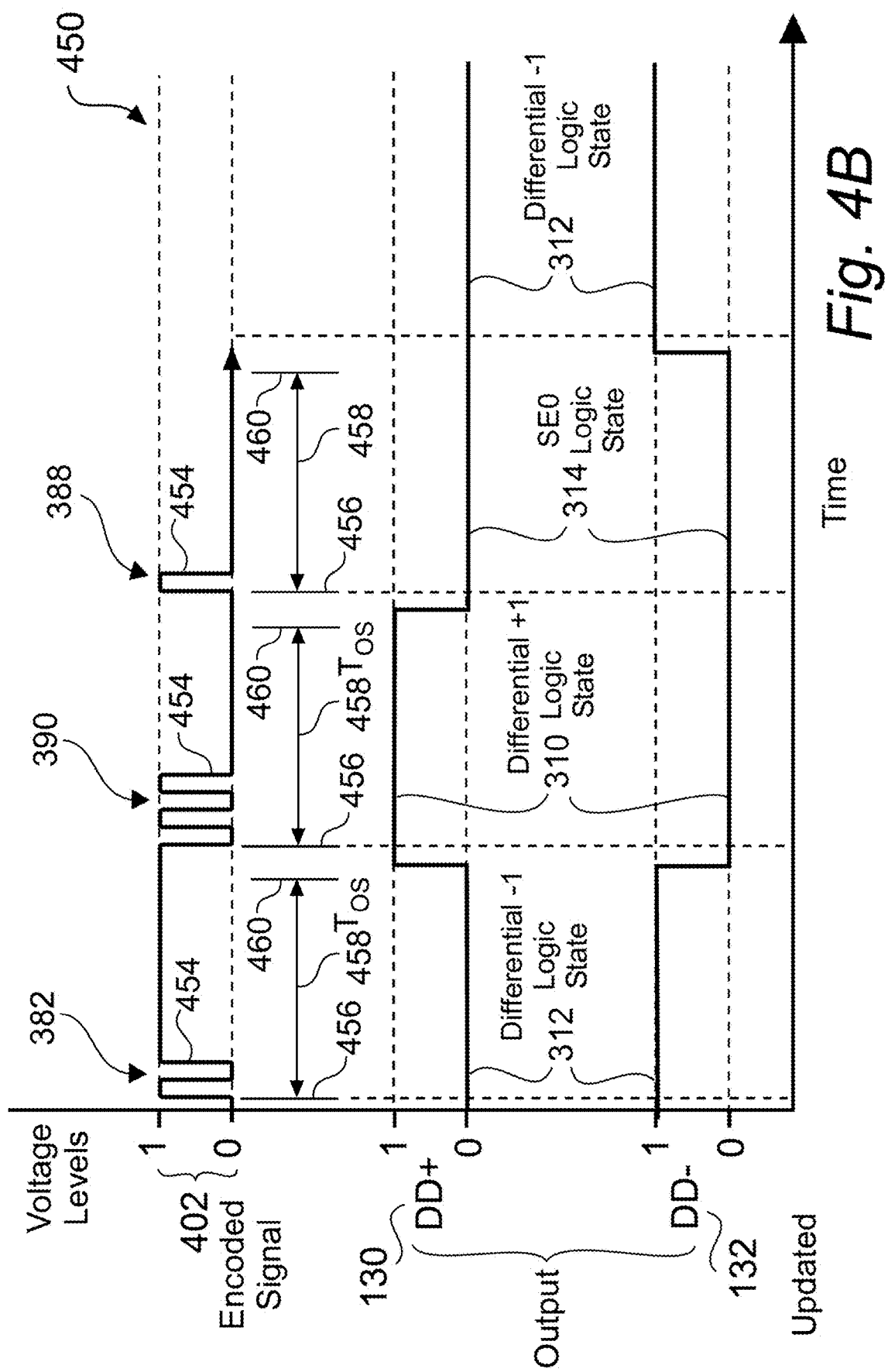
FIG. 4B is a timing diagram illustrating examples of logic states obtained by decoding pulse sequences, as may be obtained by implementing the method of FIG. 2B.

FIG. 4B is a timing diagram 450 of a non-limiting example implementation of decoding a pulse sequence as may be done in connection with the method 250 of FIG. 2B. The illustrated decoding is also consistent with the coding scheme 350 of FIG. 3B. The horizontal axis represents time. The vertical axis represents voltage level. Three pulse sequences are shown, including pulse sequences 382, 390, and 388 as previously shown in FIG. 4A. The pulse sequences 382, 390, and 388 may be decoded using the coding scheme 350 of FIG. 3B to identify the associated logic states, which are then produced on terminals DD+ 130 and DD− 132 as shown.

In practice, a time lag will exist between the time the pulse sequence is received on the secondary side of the isolator and the time the decoded logic state is produced on the output terminals of the isolator. Thus, at the start of the timing diagram of FIG. 4B, DD+ and DD− are in a preceding logic state to that produced by the encoded pulse sequences of FIG. 4A. The preceding logic state in this non-limiting example is the Differential −1 state 312. The example of FIG. 4B assumes that logic state existed prior to receipt of pulse sequence 382 from across the isolation barrier 104. Then, the three pulse sequences 382, 390, and 388 are received sequentially and decoded to produce the Differential +1, SE0, and Differential −1 logic states, respectively.

FIG. 4B additionally illustrates a fixed time period $T_{OS}$ 458 having a start 456 and end 460. As described earlier in connection with FIG. 2B, the counting of the number of edges of the received pulse sequence may be done over a fixed time period. In this manner, sequential pulse sequences may be delineated. The fixed time period 458 may be generated using a one-shot, or other suitable circuitry, and thus is labeled as $T_{OS}$.

The decoding operation illustrated in FIG. 4B may be asynchronous. Specifically, the fixed time period $T_{OS}$ 458 is triggered by the first edge of the pulse sequence received, which may be asynchronous.

The number of edges and final value or final edge of the received pulse sequence may be determined during the fixed time period $T_{OS}$ 458. Upon triggering of the fixed time period $T_{OS}$ 458, the number of edges 454 may be counted. The final value of the pulse sequence at the end 460 of the fixed time period $T_{OS}$ 458 may be determined. The logical state associated with the pulse sequence may then be determined as described previously in connection with FIGS. 2B and 3B, as a non-limiting example.

Figure 5:
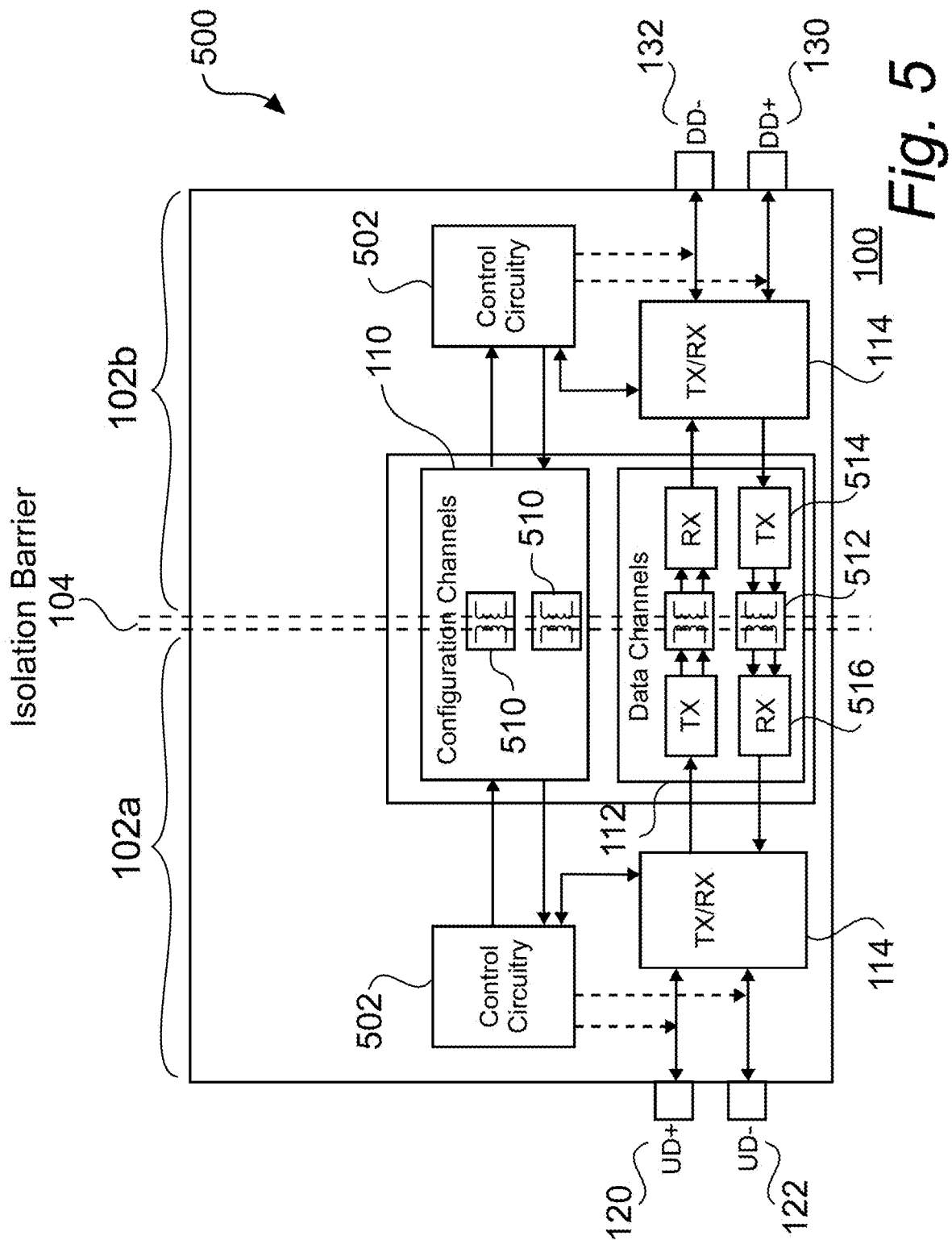
FIG. 5 is a detailed schematic view of a non-limiting example of a digital isolator that shows control circuitry associated with a clock channel, control channels, and data channels.

FIG. 5 is a schematic view of an isolator 500 representing a non-limiting example of an implementation of the digital isolator 100 of FIG. 1, and which may implement the encoding methodology of FIGS. 2A and 2B. Several components of isolator 500 were described previously in connection with FIG. 1 and are not described again in detail here. The isolator 500 further comprises control circuitry 502, isolation components 510, isolation components 512, isolator transmitters 514, and isolator receivers 516.

The control circuitry 502 is configured to control operation of the configuration channels 110 and data channels 112. Control circuitry 502 is positioned on both sides of the isolation barrier 104. The control circuitry 502 is coupled to the transmit and receive circuitry 114 and configuration channels 110 as shown by the various arrows in the figure. In some non-limiting embodiments, the control circuitry 502 seen in FIG. 5 may be used to supervise power sequencing for the isolator 500, as well as connects, disconnects, speed negotiation, and data transmission for connected devices, e.g., USB devices. The control circuitry may include any suitable circuitry for performing such functions, as well as circuitry for storing and processing control data. For example, the control circuitry may include suitable combinations of registers and fuses, among other components. The control circuitry 502 may be implemented as integrated circuitry on semiconductor dies associated with the respective voltage domains 102a and 102b.

The isolation components 510 and 512 may be any suitable type of isolation components bridging the isolation barrier 104. In the non-limiting example of FIG. 5, the isolation components 510 and 512 are transformers. However, capacitors, opto-isolators, or radio frequency (RF) isolation components may alternatively be used.

The isolator transmitters 514 and isolator receivers 516 are associated with the data channels 112. In the non-limiting example of FIG. 5, each of the two illustrated data channels 112 includes a isolator transmitter 514 and an isolator receiver 516. The isolator transmitter 514 may receive encoded pulse sequences of the types described previously herein in connection with FIGS. 3B and 4A, and may transmit those encoded pulse sequences across the corresponding isolation component 512 to the isolator receiver 516. The isolator receiver 516 may provide the received pulse sequence to a data recovery block for decoding, as described further below in connection with FIG. 6.

In some non-limiting embodiments, the transmit and receive circuitry 114 may transmit an initial framing pulse over the data channel 112, such as through the isolator transmitter 514, before transmitting encoded pulse sequences of the types described previously in connection with FIGS. 2A, 3B, and 4A. Decoding logic on the receiving side of the isolator, an example of which is described further below, may trigger upon receipt of the framing pulse. Specifically, the framing pulse may trigger a fixed period, such as fixed time period $T_{OS}$ 458, on the receiving side of the isolator. The number of edges and final value or final edge of the received pulse sequence may be determined during the fixed time period as described previously in connection with FIGS. 2B and 4B.

Figure 6:
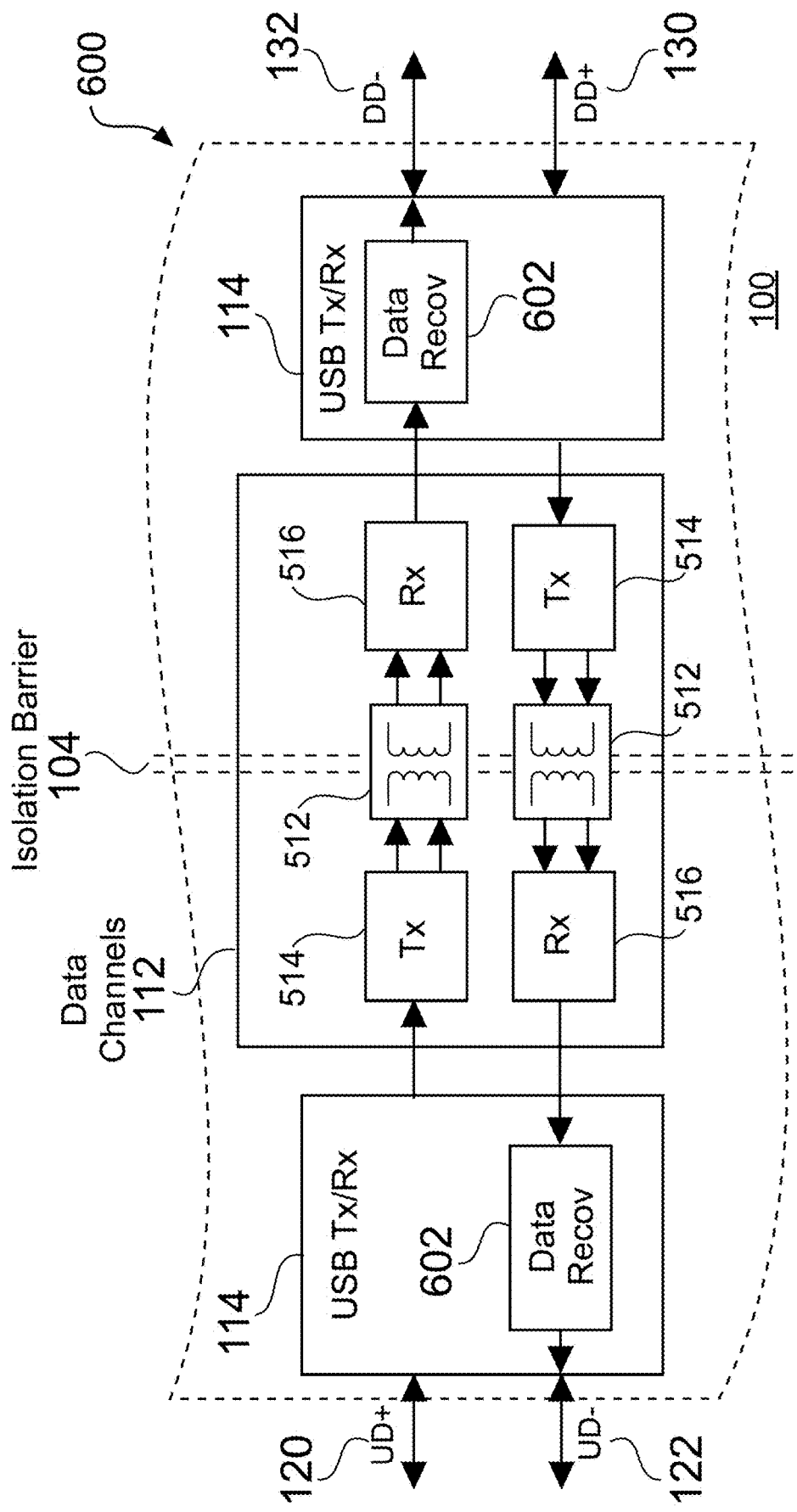
FIG. 6 illustrates a more detailed implementation of the transmit and receive circuitry 114 of isolators 100 and 500, according to a non-limiting embodiment of the present application.

FIG. 6 expands on FIG. 5 by illustrating a more detailed implementation of the transmit and receive circuitry 114 of isolators 100 and 500, according to a non-limiting embodiment of the present application. The illustrated circuitry 600 includes several components described previously in connection with FIGS. 1 and 5, which are not described again in detail here. The transmit and receive circuitry 114 on each side of the isolation barrier 104 includes data recovery circuitry 602.

The data recovery circuitry 602 is configured to facilitate decoding of encoded pulse sequences of the types described previously herein. The data recovery circuitry 602 is coupled to the isolator receivers 516 to receive the pulse sequences transmitted across the isolation barrier 104. The data recover circuitry 602 then implements a decoding technique of the types described previously herein. For instance, the data recovery circuitry 602 may count the number of edges of a received pulse sequence and may determine a final value or final edge of the received pulse sequence. The data recovery circuitry 602 may determine the logic state represented by the encoded pulse sequence, for output from the isolator.

Figure 7:
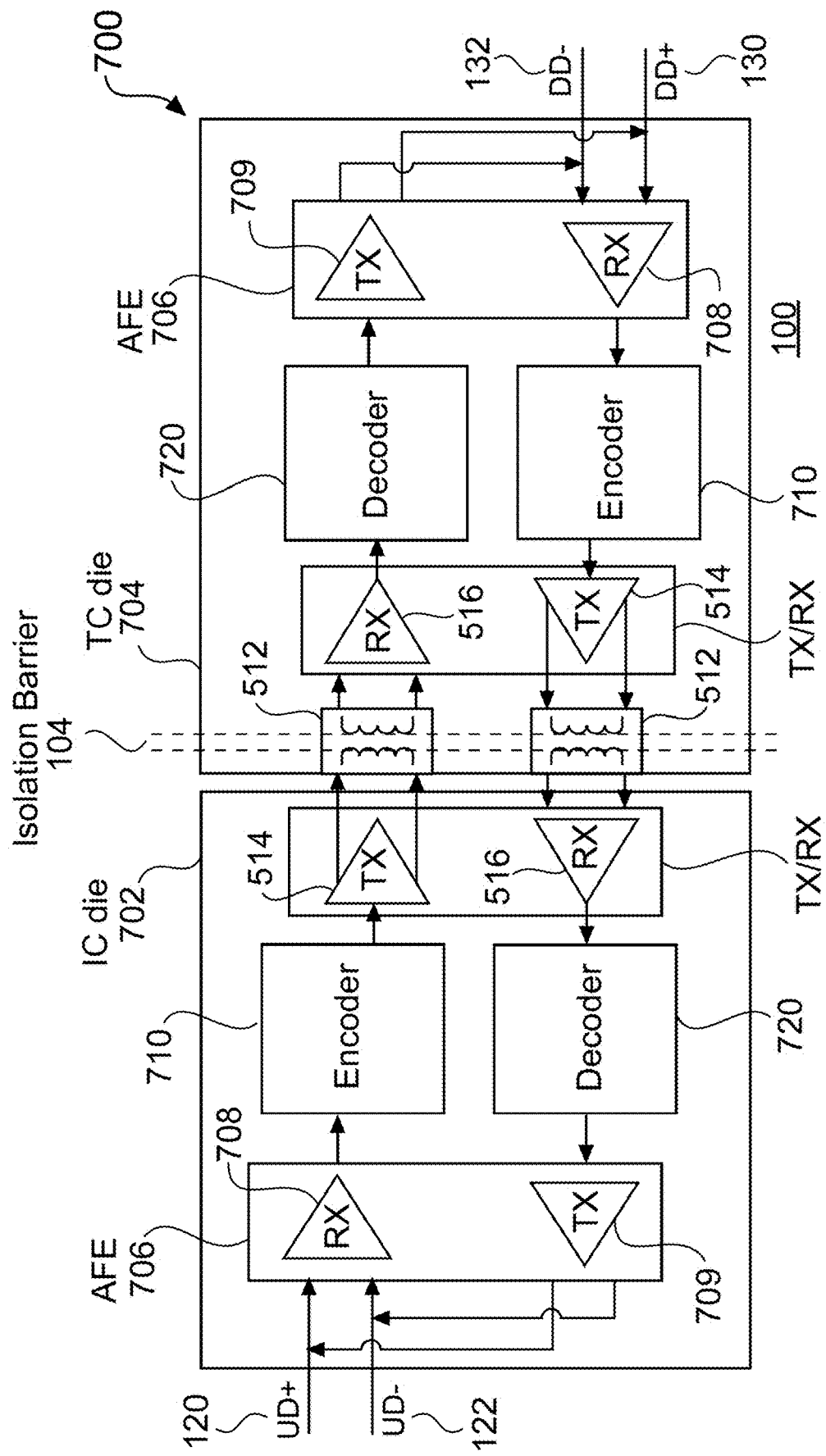
FIG. 7 is a detailed schematic view of data channel circuitry of a digital isolator, according to a non-limiting embodiment of the present application.

FIG. 7 is a schematic view of circuitry 700 representing a further detailed implementation of the circuitry of FIG. 6, according to a non-limiting embodiment of the present application. The circuitry 700 comprises several components described previously in connection with FIGS. 5 and 6, which are not described again in detail here. In this non-limiting example, the isolator comprises two dies, identified as the IC die 702 and TC die 704. The circuitry 700 includes an analog front end (AFE) 706 on each die, a receiver 708 and transmitter 709 within the AFE 706, an encoder 710 and a decoder 720.

The receiver 708 is configured to receive data on the terminals UD+ 120 and UD− 122 on the IC die 702, and on the terminals DD+ 130 and DD− 132 on the TC die 704. The respective receivers 708 are coupled to respective encoder 710 to provide the received data to the encoders.

The encoders 710 are configured to encode the received data with a pulse sequence. For example, the encoder 710 receiving the data from the respective receiver 708 may encode the data to a pulse sequence according to those methods described previously herein. The encoder may then provide the encoded pulse sequence to a respective isolator transmitter 514 for transmission across the isolation barrier 104.

The decoder 720 receives the encoded pulse sequence and decodes it to recover the input logic state. According to some embodiments, the decoder 720 decodes the pulse sequence in the manner previously described in connection with method 250 of FIG. 2B. The decoder then outputs the decoded logic state to the transmitter 709 of the AFE 706, for transmission out of the isolator.

The circuitry 700 is split between the two dies 702 and 704. The isolation components 512 are formed on the TC die in this example. It should be appreciated that other arrangements for the isolation components are also possible.

Figure 8:
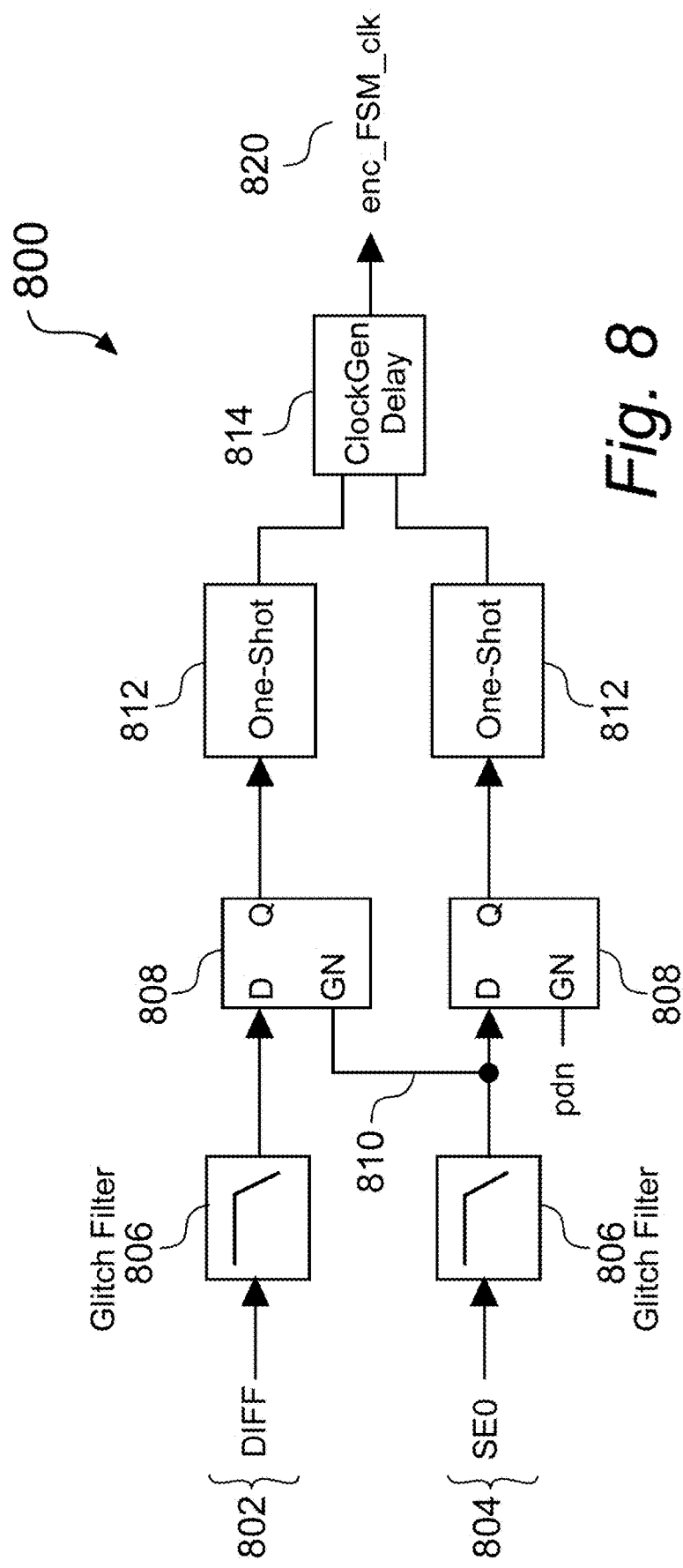
FIG. 8 is a detailed schematic view of receive circuitry in an analog front-end (AFE) of a digital isolator, according to a non-limiting embodiment of the present application.

FIG. 8 illustrates a non-limiting example of the receiver 708 of the AFE 706. The illustrated receiver 800 includes both a differential path DIFF path 802 and single-ended path SE0 path 804. Depending on whether the received logic state is a SE0 or either a Differential +1 or Differential −1, the signal passes through the respective path to be filtered by the respective glitch filter 806. The glitch filters 806 may have a different filter time associated with them depending on the speed of the data. The output terminals of the glitch filters 806 feed respective latches 808 as shown. The latch associated with the SE0 path 804 may be connected to a power delivery network which provides the second input signal (pdn) to the latch 808. The latches 808 feed respective one-shot circuits 812, which in turn feed a clock generation delay circuit 814. The clock generation delay circuit 814 outputs a clock signal, which may be used to transmit the encoded pulse sequence across the isolation component. The output clock signal (enc_FSM_clk) 820 may also be used by an encoder state machine of the encoder 710 to advance states and initiate transmissions across the isolation component.

Figure 9:
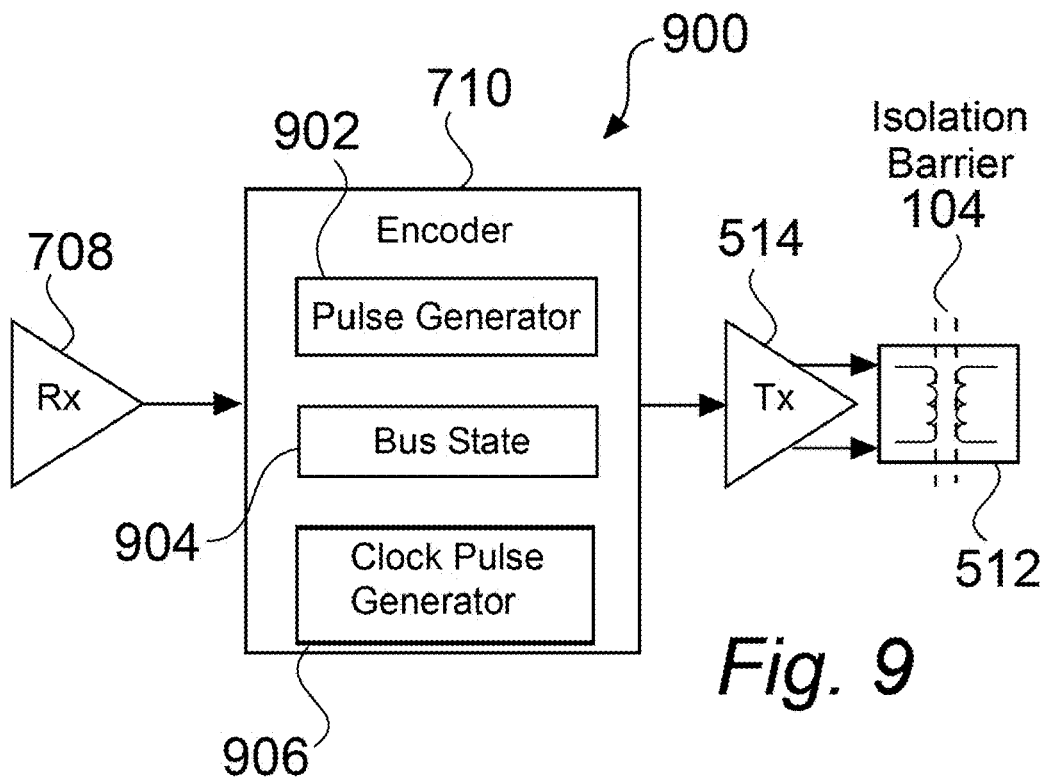
FIG. 9 illustrates a detailed schematic view of an encoder for generating and transmitting encoded pulse signals across a data channel of a digital isolator, according to a non-limiting embodiment of the present application.

FIG. 9 shows a non-limiting example implementation of the encoder 710. The circuitry 900 includes a pulse generator 902, bus state monitor 904, and clock pulse generator 906. The pulse generator encodes incoming logic states as pulse sequences in the manner described previously herein. The bus state monitor 904 monitors the state of the bus and provides such information to the pulse generator 902 to generate the appropriate pulse sequence, as described previously in connection with FIG. 3B. The clock pulse generator 906 generates an asynchronous clock pulse to trigger operation of the pulse generator 902.

In some embodiments, the clock pulse generator 906 triggers immediately in response to whichever glitch filter of FIG. 8 changes its output first. In some embodiments, the clock pulse generator 906 asserts a pulse sufficiently long to ensure its trailing edge occurs after whichever glitch filter of FIG. 8 changes its output last. In some embodiments, the trailing edge of the clock pulse 906 may be used to trigger a state change in a corresponding isolator transmitter 514, such as with an H-bridge associated with the isolator transmitter 514, which may be used to cause the isolator transmitter 514 to transmit an encoded pulse sequence across the isolation component 512.

Figure 10:
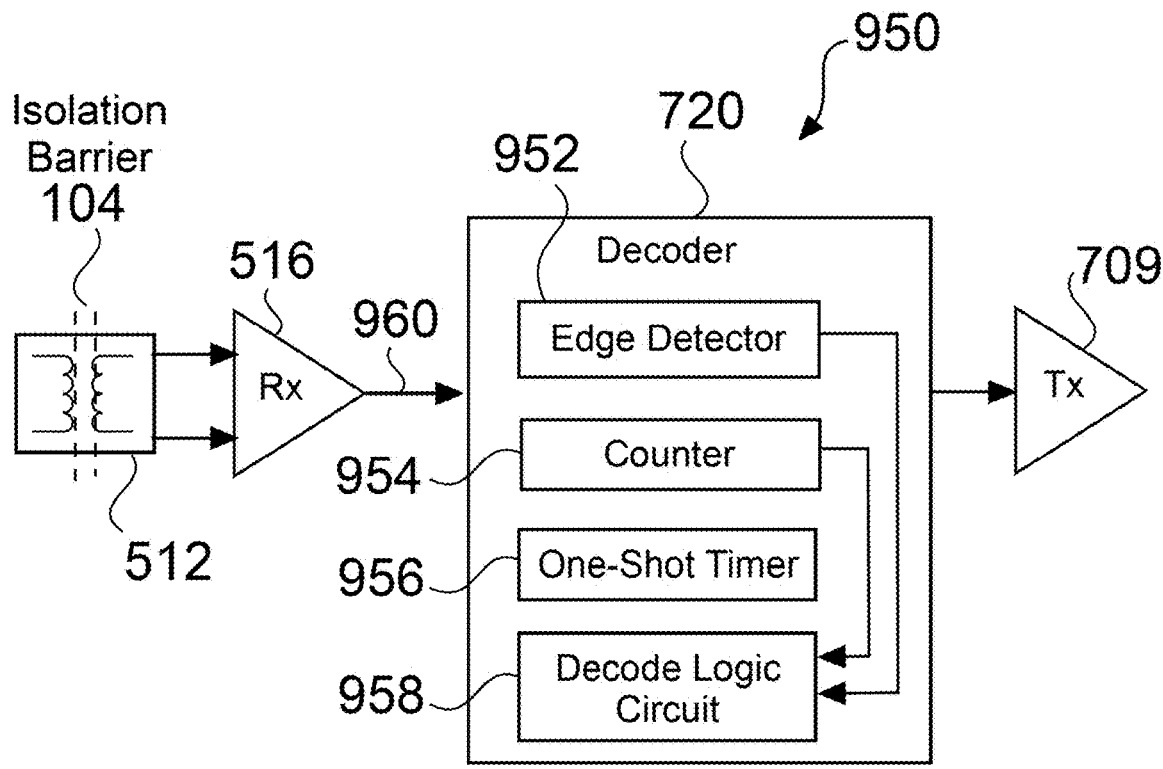
FIG. 10 illustrates a detailed schematic view of a decoder for receiving and decoding a sequence of encoded pulse signals in a digital isolator, according to a non-limiting embodiment of the present application.

FIG. 10 shows a non-limiting example implementation of the decoder 720. The circuitry 950 comprises an edge detector 952, counter 954, one-shot timer 956, and decode logic circuit 958. The one-shot timer 956 may be triggered by the first edge of the received pulse sequence 960 output by the isolator receiver 516, thus generating a one-shot period. The edge detector 952 detects edges of the pulse sequence during the one-shot period. The counter 954 counts the number of edges of the pulse sequence during the one-shot period. The decode logic circuit 958 receives the output of the counter 954 and may also receive the output of the edge detector 952. The decode logic circuit processes the number of edges as counted by the counter 954 and the final value or final edge of the pulse sequence as provided by the edge detector and determines the logic state associated with those values.

Figure 11:
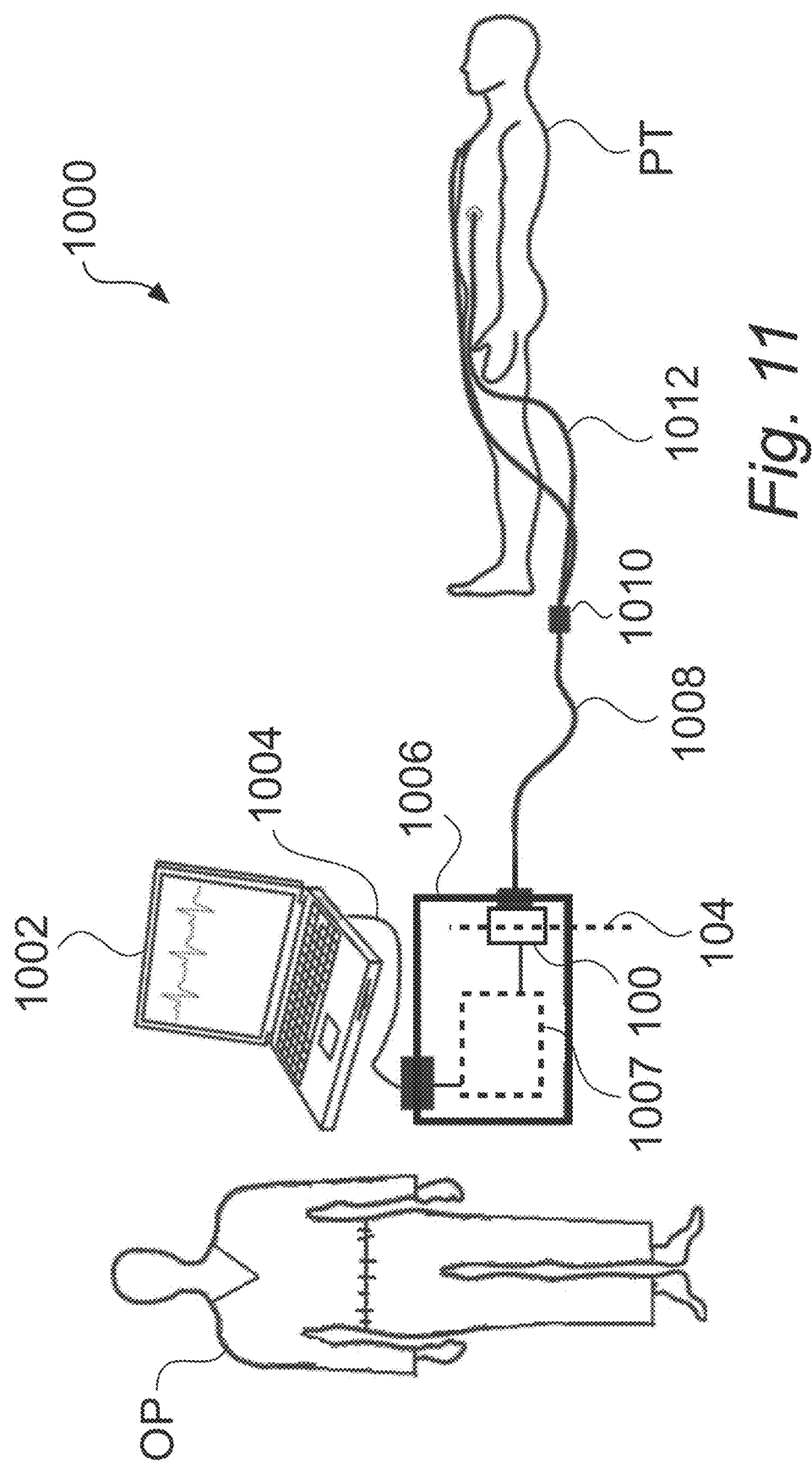
FIG. 11 is a schematic depiction of an isolated system in which a digital isolator of the types described herein may be employed, according to a non-limiting embodiment of the present application.

Digital isolators of the types described herein may be used in various settings. FIG. 11 is a schematic of an example system 1000 in which the digital isolators 100 may be utilized. The system 1000 comprises a computer 1002 connected by a cable 1004 to one side of an electrocardiogram (ECG) monitor 1006, for connection to associated circuitry 1007. An ECG sensor hub 1010, having ECG leads 1012 that are connected to a patient PT, may be connected by a cable 1008 to an opposite side of the ECG monitor 1006, for connection to the associated circuitry 1007. A digital isolator 100 may be integral to the ECG monitor 1006 and provides an isolation barrier 104, such as between the circuitry 1007 and the cable 1008. Digital isolators 100 as described herein may be used to protect equipment, and can protect patients PT and/or operations personnel OP in medical applications, while conforming to relevant safety standards.

Some of the non-limiting embodiments described herein may be implemented in a variety of applications, such as for any of healthcare and medical systems, industrial automation and/or control, automotive implementations, scientific applications, or other instrumentation and measurement applications.

Aspects of the present application may provide various benefits. Some non-limiting examples are now described. Benefits other than those listed may be realized in some embodiments, and not all embodiments provide all benefits. As explained above, in some non-limiting embodiments, two bits of information may be communicated through a digital isolator channel supporting two logic levels. Thus, the number of isolator channels required to communicate full-speed and low speed USB 2.0 data may be reduced, e.g., from four channels to two channels. This, in turn, can save die area, reduce cost, and/or reduce power consumption in digital isolator products. The techniques described herein are broadly applicable to many applications besides USB 2.0.

Some non-limiting embodiments of the digital isolators described herein can be used to communicate multiple bits of digital data through a channel normally used to communicate one bit. Furthermore, some non-limiting embodiments of the digital isolators described herein can provide timing advantages, in that data transmission can occur asynchronously and immediately in response to new input activity, without any sampling to another time base.

Digital isolators of the types described herein can also provide noise immunity such as by using isolation to break ground loops that could otherwise include a USB cable's ground wire, and/or to ensure robust signaling in noisy environments.

While some of the non-limiting embodiments are described herein for USB 2.0 and other digital isolator products, the techniques may be applied to many applications other than USB isolators.

Some embodiments of USB isolators as described herein may support 480 Mbps high speed (HS) data. Some embodiments of USB isolators as described herein may be configured for large package/module for reinforced applications. Some embodiments of USB isolators as described herein may be configured for smaller packages, such as for functional isolation. Some embodiments of USB isolators as described herein may provide improved EMI performance, e.g., radiated emissions below FCC and CISPR class B limits, and/or immunity to common-mode transients and supply noise.

Having thus described several aspects of at least one embodiment, it is to be appreciated that various alterations, modifications, and improvements will readily occur to those skilled in the art. As one example, different features were discussed above in connection with different embodiments. Those features may be used alone or in combination unless otherwise noted.

What is claimed is:

1. A method for processing a digital pulse sequence transmitted across an isolation barrier of a digital isolator and representing a logic state of a data signal line, the method comprising:

during a fixed period, counting a number of edges of the digital pulse sequence;
determining a polarity of a representative edge of the digital pulse sequence or a final value of the digital pulse sequence during the fixed period; and
determining the logic state from:
(A) the number of edges, and
(B) the polarity of the representative edge or the final value of the digital pulse sequence.

2. The method of claim 1, wherein the logic state is a first logic state of a plurality of potential logic states, and wherein determining the logic state from (A) the number of edges, and (B) the polarity of the representative edge or the final value of the digital pulse sequence, comprises differentiating between the first logic state and a second logic state of the plurality of potential logic states based on the number of edges.

3. The method of claim 1, wherein the logic state is a first logic state of a plurality of potential logic states, and wherein determining the logic state from (A) the number of edges, and (B) the polarity of the representative edge or the final value of the digital pulse sequence, comprises differentiating between the first logic state and a second logic state of the plurality of potential logic states based on the polarity of the representative edge or the final value of the digital pulse sequence.

4. The method of claim 3, wherein determining the logic state from (A) the number of edges, and (B) the polarity of the representative edge or the final value of the digital pulse sequence, comprises differentiating between the first logic state and a third logic state of the plurality of potential logic states based on the number of edges.

5. The method of claim 4, wherein the representative edge is a final edge of the digital pulse sequence.

6. The method of claim 1, further comprising, subsequent to determining the logic state, recreating the logic state.

7. The method of claim 1, further comprising triggering the fixed period with a one-shot circuit.

8. The method of claim 1, wherein the representative edge is a final edge of the digital pulse sequence.

9. A receiver for processing a digital pulse sequence received across an isolation barrier of a digital isolator and representing a logic state of a data signal line, comprising:
an edge detector circuit configured to sample the received digital pulse sequence during a fixed time period, and further configured to produce an output signal responsive to one or more rising or falling edges detected in the received digital pulse sequence during the fixed time period;
a counter circuit configured to count a total number of edges detected by the edge detector circuit during the fixed time period based on the output signal of the edge detector circuit; and
a decode logic circuit configured to:
determine a polarity of a representative edge of the digital pulse sequence or a final value of the digital pulse sequence during the fixed period, based on the output of the edge detector circuit, and determine the logic state from:
(A) the total number of edges counted by the counter circuit during the fixed time period, and
(B) the polarity of the representative edge or the final value of the digital pulse sequence.

10. The receiver of claim 9, wherein the logic state is a first logic state of a plurality of potential logic states, and wherein the decode logic circuit is configured to determine the logic state from (A) the total number of edges, and (B) the polarity of the representative edge or the final value of the digital pulse sequence, by differentiating between the first logic state and a second logic state of the plurality of potential logic states based on the total number of edges counted by the counter circuit during the fixed time period.

11. The receiver of claim 9, wherein the logic state is a first logic state of a plurality of potential logic states, and wherein the decode logic circuit is configured to determine the logic state from (A) the total number of edges, and (B) the polarity of the representative edge or the final value of the digital pulse sequence, by differentiating between the first logic state and a second logic state of the plurality of potential logic states based on the polarity of the representative edge or the final value of the digital pulse sequence.

12. The receiver of claim 9, further comprising an output circuit configured to output the determined logic state from the digital isolator.

13. The receiver of claim 9, further comprising a one-shot circuit configured to trigger the fixed period.

14. The receiver of claim 13, wherein the one-shot circuit is configured to trigger the fixed period upon detection of a first edge by the edge detector circuit.

15. The receiver of claim 13, wherein the one-shot circuit is configured to reset at the end of the fixed period.

16. The receiver of claim 9, wherein the representative edge is a final edge of the digital pulse sequence.

17. A coding method for communicating at least three logic states across a digital isolator channel having an isolation barrier between different voltage domains, the method comprising:
receiving at the digital isolator a data signal representing a logic state;
encoding the logic state as a pulse sequence having (A) a number of edges, and (B) a final value or representative edge, uniquely identifying the logic state; and
transmitting the pulse sequence across the isolation barrier.

18. The coding method of claim 17, wherein the representative edge is a final edge of the pulse sequence.

19. The coding method of claim 17, wherein the logic state is a first logic state of a plurality of potential logic states, and wherein encoding the logic state as a pulse sequence comprises selecting the number of edges based on a frequency of occurrence of the first logic state.

20. The coding method of claim 17, wherein encoding the logic state as a pulse sequence comprises selecting the number of edges based on a previous logic state received at the digital isolator.

* * * * *